United States Patent [19]

Lai

[11] Patent Number: 5,181,436
[45] Date of Patent: Jan. 26, 1993

[54] STEM FOR INTERCONNECTING A HANDLEBAR AND A HEAD TUBE OF A BICYCLE

[76] Inventor: Richard Lai, No. 302-1, Chang-Yuan Rd., Chang-Sha Tsun, Hua-Tan Hsiang, Changhua Hsien, Taiwan

[21] Appl. No.: 898,304
[22] Filed: Jun. 15, 1992
[51] Int. Cl.$^5$ .............................................. B62K 21/14
[52] U.S. Cl. .................... 74/551.2; 403/120
[58] Field of Search ............................. 74/551.2, 551.1; 403/120; 248/578; 16/298, 299, 300, 301

[56] References Cited

U.S. PATENT DOCUMENTS 1,948,788  2/1934  Goldberg et al. ................... 403/120
4,939,950  7/1990  Girvin ............................. 74/551.2

FOREIGN PATENT DOCUMENTS 372510  4/1907  France ................................. 74/551.2
11900  of 1907  United Kingdom ............... 74/551.2
591126  8/1947  United Kingdom ............... 74/551.2

Primary Examiner—Rodney H. Bonck
Attorney, Agent, or Firm—Ladas & Parry

[57] ABSTRACT

A stem for interconnecting a handlebar and a head tube or bicycle includes an upright tube and a connecting tube pivoted to two lug portions of the upright tube. Each of the lug portions of the upright tube has a torsional spring mounted in a through bore of the lug portion and a positioning disc attached to the outside face of the lug portion. The positioning disc has a plurality of adjusting holes circumferentially formed. The torsional spring has a first end engaging the connecting tube and a second end engaging one of the adjusting holes of the positioning disc. The torsional spring can absorb the shock wave produced from the front wheel of a bicycle. The angle between the connecting tube and the upright tube can be varied by inserting the second end of the torsional spring into different adjusting holes of the positioning disc.

2 Claims, 5 Drawing Sheets

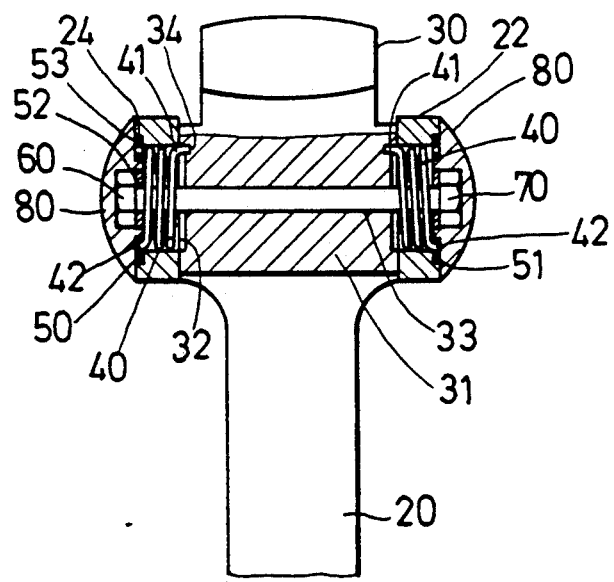
FIG. 4
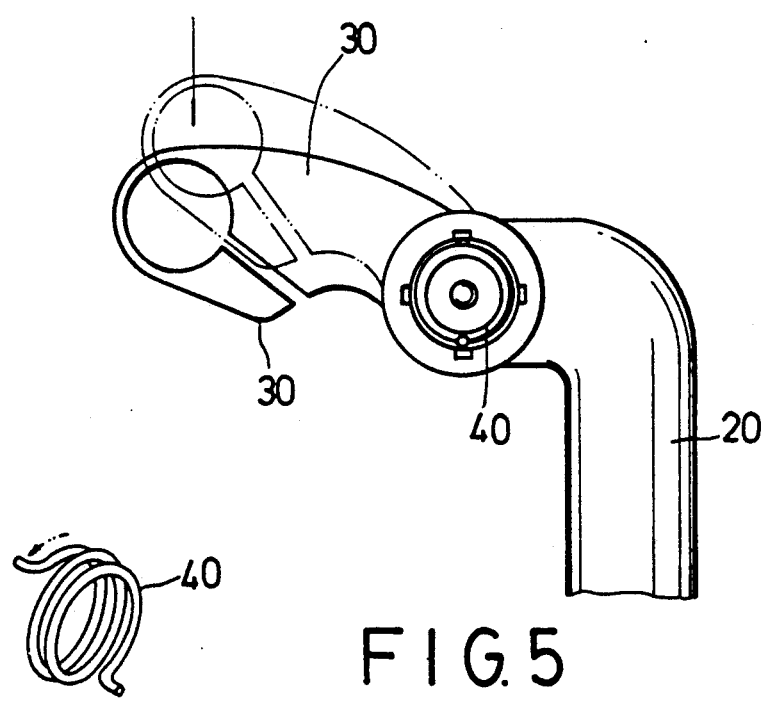
FIG. 5(A)
FIG. 5

STEM FOR INTERCONNECTING A HANDLEBAR AND A HEAD TUBE OF A BICYCLE

BACKGROUND OF THE INVENTION

1. Field of the Invention

This invention relates to a stem for interconnecting a handlebar and a head tube of a bicycle, more particularly to a stem having an upright tube and a connecting tube pivoted to each other and a torsional spring member mounted therebetween.

2. Description of the Related Art

Conventionally, the stem for interconnecting a handlebar and a head tube of a bicycle includes an upright tube connected to the head tube and a connecting tube engaging the handlebar. The upright tube and the connecting tube are welded at a predetermined angle with respect to each other. The predetermined angle is preferably 105° or 110°. However, a rider cannot change the angle between the connecting tube and upright tube according to his/her height. In addition, because the handlebar is mounted over the front wheel, the shock waves produced from the wheel are transmitted to the handlebar and the arms of the rider when the rider is riding the bicycle.

SUMMARY OF THE INVENTION

It is therefore an object of this invention to provide a stem for interconnecting the handlebar and the head tube of a bicycle which has a shock absorbing means in order to reduce the shock waves transmitted to the arms of a rider.

It is another object of this invention to provide a stem for interconnecting the handlebar and the head tube of a bicycle which has an upright tube and a connecting tube pivoted to the upright tube so that the angle between the upright tube and the connecting tube of the stem can be adjusted.

Accordingly, the stem of this invention includes an upright tube connected to the head tube and a connecting tube having a first end connected to the handlebar and a second end connected to the upright tube. The upright tube has two opposite lug portions extending therefrom. Each of the lug portions has a through bore aligned with the through bore of the other one of the lug portions. Each of the lug portions has a pair of diametrically opposed notches formed on the outside face of each of the lug portions. The second end of the connecting tube has a cylindrical member with two ends mounted between the two lug portions. Each of the ends of the cylindrical member has a positioning hole formed therein. The cylindrical member has an axial through hole aligned with the two through bores of the lug portions. Each member of a pair of positioning discs has a pair of diametrically opposed radial projections. The diametrically opposed radial projections respectively engage the diametrically opposed notches of the two outside faces of the lug portions. Each of the positioning discs has a plurality of adjusting holes circumferentially formed thereon.

Two torsional springs are respectively mounted in the through bores of the lug portions between the positioning discs and the ends of the cylindrical member of the connecting tube. Each of the torsional springs has a first end engaging with one of the positioning holes of the cylindrical member and a second end engaging with one of the adjusting holes of one of the discs. A bolt passes through the central holes of the discs, the torsional springs, the through bore of the lug portions and the axial through holes of the cylindrical member and engages a nut.

BRIEF DESCRIPTION OF THE DRAWINGS

Other features and advantages of this invention will become apparent in the following detailed description of the preferred embodiments of this invention with reference to the accompanying drawings, in which:

FIG. 4 is a sectional view of the stem of this invention taken along the line IV—IV of FIG. 1;

FIG. 5 is a schematic view showing the stem of this invention in an operative positive when a shock wave is transmitted to the stem;

FIG. 5(A) is a schematic view showing the torsional spring being twisted when the shock wave is transmitted to the stem of this invention;

DETAILED DESCRIPTION OF THE PREFERRED EMBODIMENTS

Figure 1:
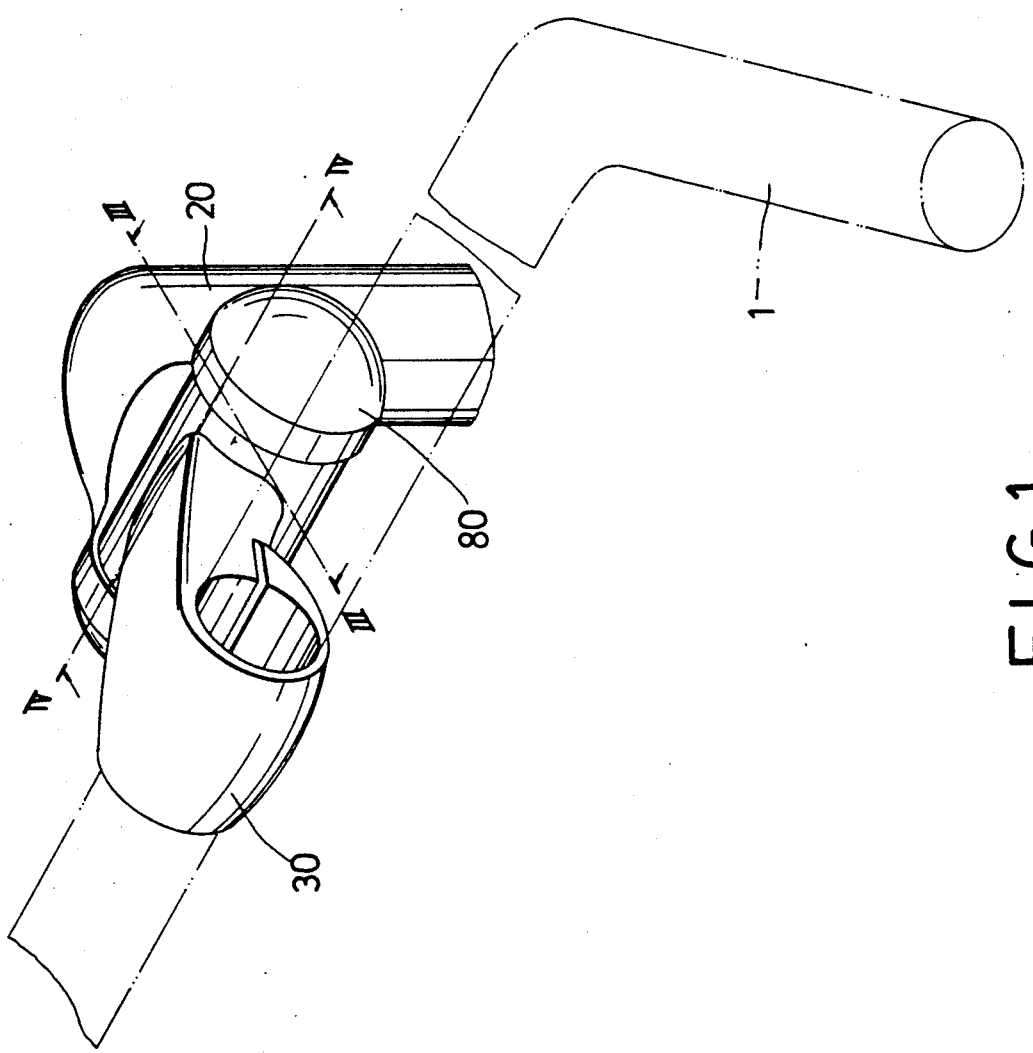
FIG. 1 is a perspective view of a preferred embodiment of a stem for interconnecting a handlebar and a head tube of a bicycle according to this invention.
Figure 2:
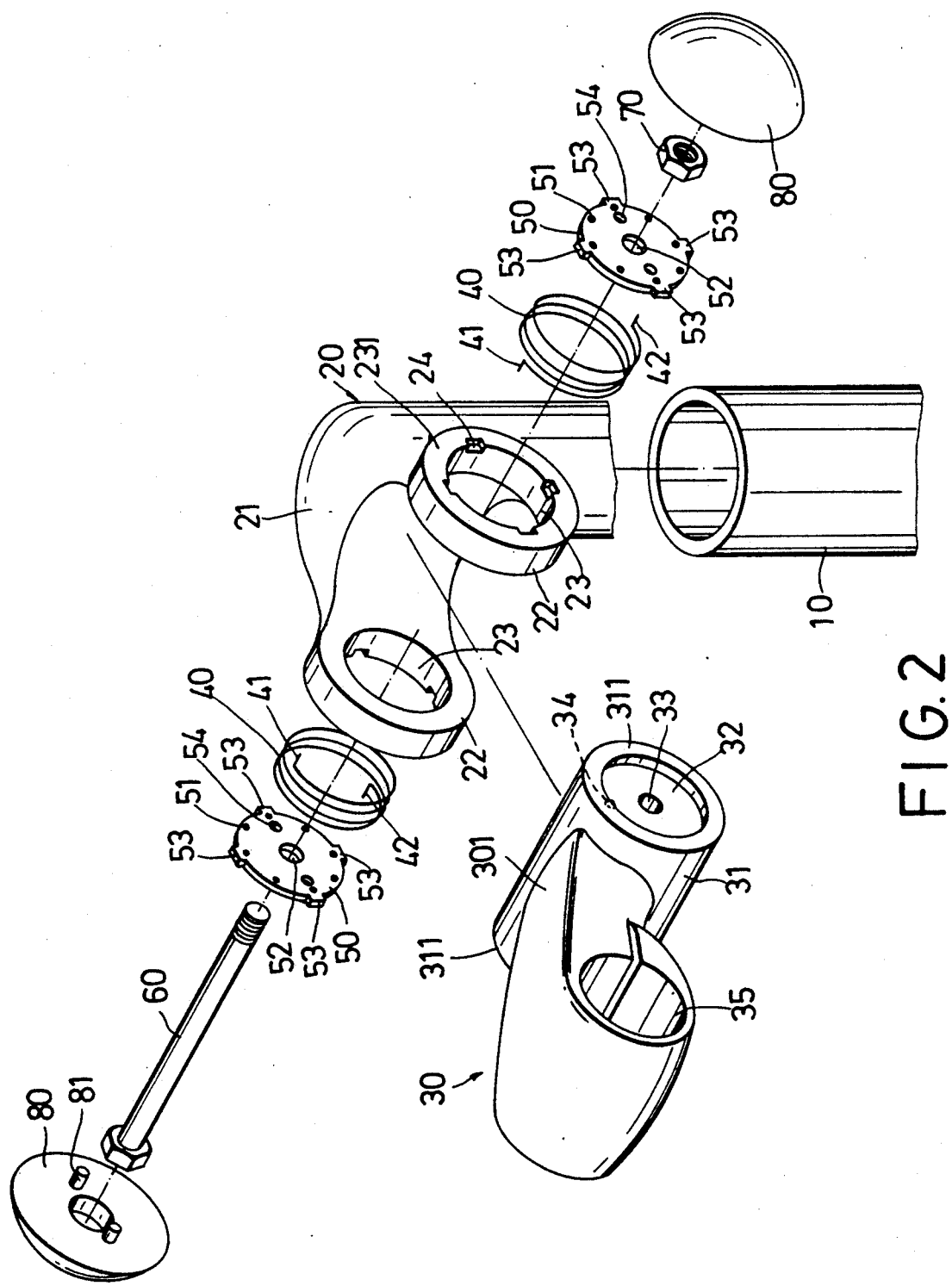
FIG. 2 is a perspective exploded view of the preferred embodiment of a stem for interconnecting a handlebar and a head tube of a bicycle according to this invention.
Figure 3:
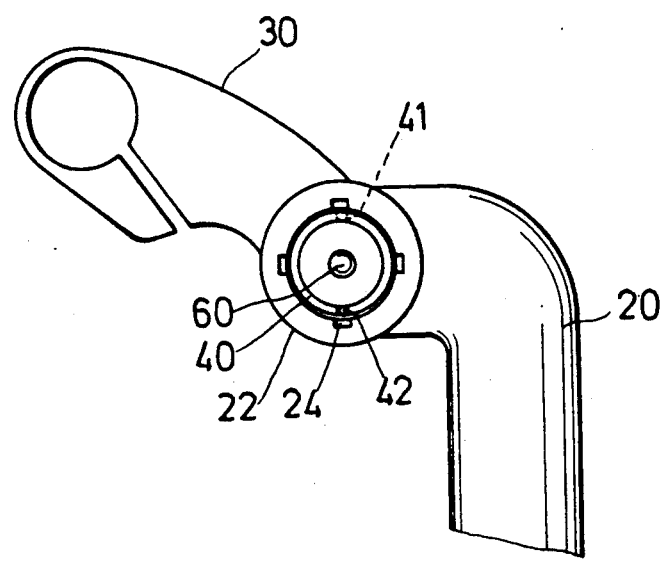
FIG. 3 is a sectional view of the stem of this invention taken along the line III—III of FIG. 1.

FIGS. 1 and 2 show a preferred embodiment of a stem for interconnecting a handlebar 1 and a head tube 10 of a bicycle of this invention. The stem includes an upright tube 20 connected to the head tube 10 and a connecting tube 30 having a first end 35 adapted to clamp the handlebar 1 and a second end 301 connected to the upright tube 20. The upright tube 20 has two opposite lug portions 22 extending from its top end 21. Each of the lug portions 22 has a through bore 23 aligned with the through bore 23 of the other one of the lug portions 22. Each of the lug portions 22 has two pairs of diametrically opposed notches 24 equally spaced on the outside face 231 of each of the lug portions 22, as shown in FIG. 3.

The second end 301 of the connecting tube 30 has a cylindrical member 31 with two ends 311 mounted between the two lug portions 22. Each of the ends 311 of the cylindrical member 31 has a recess 32 and a positioning hole 34 formed therein. The cylindrical member 31 has an axial through hole 33 aligned with the two through bores 23 of the lug portions 22. A pair of positioning discs 50 are respectively mounted to the outside faces 231 of the lug portions 22. Each the positioning discs 50 has two pairs of diametrically opposed radial projections 53. The diametrically opposed radial projections 53 respectively engage the pairs of diametrically opposed notches 24 of the two outside faces 231 of the lug portions 22. Therefore, the positioning discs 50 will not rotate with respect to the lug portions 22. Each of the positioning discs 50 has a central hole 52 and a plurality of adjusting holes 51 circumferentially formed thereon. Two torsional springs 40 are respectively mounted in the through bores 23 of the lug portions 22 between the positioning discs 50 and the ends 311 of the cylindrical member 31 of the connecting tube 30. Each of the torsional springs 40 has a first end 41 engaging with one of the positioning holes 34 of the cylindrical member 31 and a second end 42 engaging with one of the adjusting holes 51 of one of the discs 50. A part of each of the torsional springs 40 adjacent to the first end 41 are received in the recess 32 of one of the ends 311 of the cylindrical member 31. A bolt 60 passes through the central holes 52 of the discs 50, the torsional springs 40, the through bores 23 of the lug portions 22 and the axial through holes 33 of the cylindrical member 31 and engages a nut 70. Thus, the positioning discs 50, the torsional springs 40, the connecting tube 30 and the upright tube 20 can be fastened together, and the connecting tube 30 is pivoted to the upright tube 20. Two cap members 80 are respectively mounted to the outside faces of the positioning discs 50 for aesthetic purposes. Each of the cap members 80 has two studs 81 inserted into two mounting holes 54 formed in the positioning discs 50. The assembled stem of this invention is best illustrated in FIG. 4.

If the front wheel of the bicycle passes a rock or the like, a shock wave is produced and transmitted to the handlebar when the rider is riding on a road. Under this condition, the connecting tube 30 which is connected to the handlebar will move downward, as shown in FIG. 5. Meanwhile, the torsional springs 40 will be biased, as shown in FIG. 5(A). The connecting tube 30 will then return to its original position by the restoring force of the torsional springs 40. The shock wave produced from the front wheel will be dramatically absorbed due to the movement of the torsional springs 40. Therefore, the shock wave will not injure the rider's arms.

Figure 6:
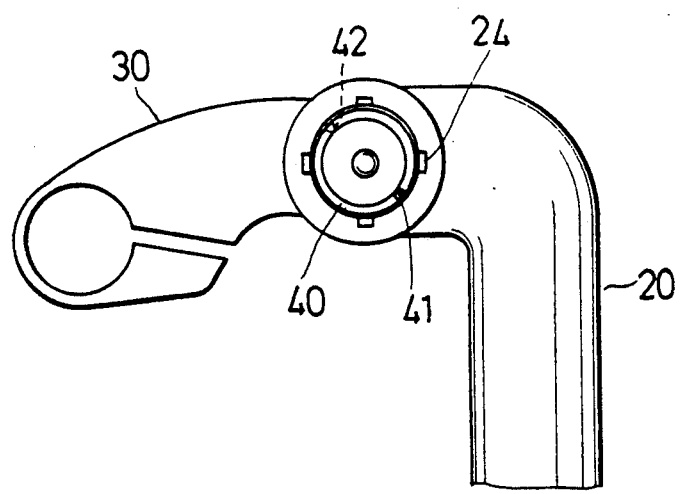
FIG. 6 is a schematic view showing the connecting tube being rotated with respect to the upright tube of the stem of this invention.

Referring to FIG. 6, the angle between the upright tube 20 and the connecting tube 30 may be varied by withdrawing the bolt 60 and re-inserting the second ends 42 of the torsional springs into an adjacent adjusting hole 51 on the positioning discs 50, enabling the connecting tube 30 to rotate when the other parts of the stem are assembled as in the aforementioned manner. In this way, the rider can adjust the angle between the connecting tube 30 and the upright tube 20 according to his/her height.

Figure 7:
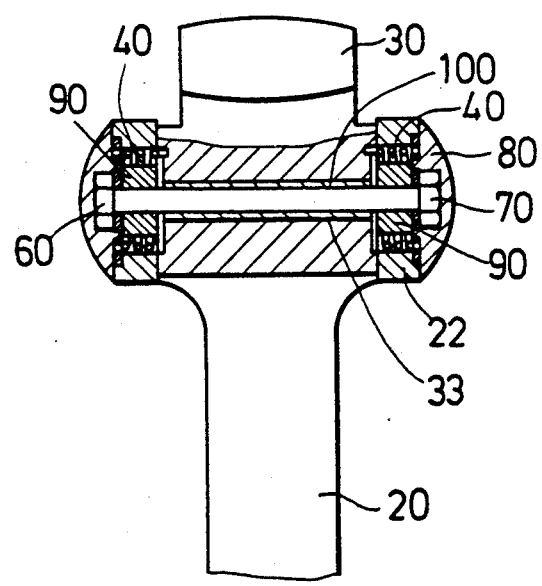
FIG. 7 is a perspective exploded view of a second preferred embodiment of a stem for interconnecting a handlebar and a head tube of a bicycle according to this invention.

Two copper rings 90 may be respectively inserted into the two torsional springs 40 in order to prevent the torsional springs 40 from being damaged by over-twisting of the torsional springs 40. In addition, a copper sleeve 100 may be sleeved around the bolt 60 so as to reduce the wearing of the bolt 60, as best illustrated in FIG. 7.

With this invention thus explained, it is apparent that numerous modifications and variations can be made without departing from the scope and spirit of this invention. It is therefore intended that this invention be limited only as indicated in the appended claims.

I claim:

1. A stem for interconnecting a handlebar and a head tube of a bicycle, said stem comprising an upright tube connected to said head tube and a connecting tube having a first end connected to said handlebar and a second end connected to said upright tube, the improvement comprising said upright tube having two opposite lug portions extending therefrom, each of said lug portions having a through bore aligned with the through bore of the other one of said lug portions, each of said lug portions having a pair of diametrically opposed notches formed on an outside face of each of said lug portions, said second end of the connecting tube having a cylindrical member with two ends mounted between said two lug portions, each of said ends of said cylindrical member having a positioning hole formed therein, said cylindrical member having an axial through hole aligned with said two through bores of said lug portions, a pair of positioning discs each of which has a pair of diametrically opposed radial projections, said diametrically opposed radial projections respectively engaging said pair of diametrically opposed notches of said two outside faces of said lug portions, each of said positioning discs having a central hole and a plurality of adjusting holes circumferentially formed thereon, two torsional springs each of which is mounted in said through bore of said lug portion between one of said positioning discs and one of the ends of the cylindrical member of the connecting tube, each of said torsional springs having a first end engaging with one of said positioning holes of said cylindrical member and a second end engaging with one of said adjusting holes of one of said positioning discs, a bolt having an end passing through said central holes of said positioning discs, said torsional springs, said through bores of said lug portions and said axial through hole of said cylindrical member and engaging a nut.

2. A stem as claimed in claim 1, wherein each of said ends of said cylindrical member of said connecting tube has a recess which receives a part of said torsional springs adjacent said first ends of said torsional springs.

* * * * *